(12) United States Patent
Iwasaki et al.

(10) Patent No.: US 10,663,382 B2
(45) Date of Patent: May 26, 2020

(54) TESTING APPARATUS FOR APPLYING TEST LOAD USING VACUUM PRESSURE

(71) Applicant: Canada Scaffold Supply Co. Ltd., Richmond (CA)

(72) Inventors: Keith Iwasaki, Vancouver (CA); Chris Musil, Surrey (CA)

(73) Assignee: Canada Scaffold Supply Co. Ltd., Richmond (CA)

( * ) Notice: Subject to any disclaimer, the term of this patent is extended or adjusted under 35 U.S.C. 154(b) by 0 days.

(21) Appl. No.: 16/118,336

(22) Filed: Aug. 30, 2018

(65) Prior Publication Data

US 2020/0072717 A1    Mar. 5, 2020

(51) Int. Cl.
*G01N 3/00* (2006.01)
*G01N 3/12* (2006.01)
*G01N 3/02* (2006.01)

(52) U.S. Cl.
CPC ............... *G01N 3/12* (2013.01); *G01N 3/02* (2013.01)

(58) Field of Classification Search
CPC .................................. G01N 3/12; G01N 3/02
USPC ......................................................... 73/786
See application file for complete search history.

(56) References Cited

U.S. PATENT DOCUMENTS

| 4,598,246 A * | 7/1986 | Staples | G01R 31/2808 324/754.08 |
| 4,749,943 A * | 6/1988 | Black | G01R 1/073 29/739 |
| 2004/0134287 A1 * | 7/2004 | Lin | B24B 37/30 73/825 |
| 2006/0158179 A1 * | 7/2006 | Chyan | G01R 31/2893 324/750.25 |
| 2006/0244467 A1 * | 11/2006 | Abboud | H01L 21/67201 324/750.14 |
| 2016/0313384 A1 * | 10/2016 | Henderson | G01R 31/2881 |

FOREIGN PATENT DOCUMENTS

CN         102338717 B       1/2014

OTHER PUBLICATIONS

EPO, machine translation of CN102338717B, retrieved Nov. 23, 2018, 17 pages.

* cited by examiner

*Primary Examiner* — Max H Noori
(74) *Attorney, Agent, or Firm* — Cameron IP (57) ABSTRACT

A testing apparatus for applying a test load to a specimen, comprises a cradle and a test bed supported on the cradle. The test bed has a chamber which receives a specimen and is hermetically sealed with the specimen received inside. There is a vacuum source in communication with the chamber. The vacuum source provides vacuum pressure to the chamber, thereby applying a uniform load to the specimen.

11 Claims, 11 Drawing Sheets

TESTING APPARATUS FOR APPLYING TEST LOAD USING VACUUM PRESSURE

TECHNICAL FIELD

The present disclosure relates to a testing apparatus for applying a test load to a specimen and, in particular, to a testing apparatus for applying a test load to a specimen using vacuum pressure.

BACKGROUND

Chinese Patent No. 102338717B, which issued on Jan. 1, 2014 to Zhang et al., discloses a testing apparatus for wood-based panels that uses a vacuum system to apply a load. A wood-based panel is first placed in a rectangular frame having a bottom plate. The rectangular frame is covered by a flexible cover which hermetically seals the rectangular frame so that the rectangular frame forms a vacuum chamber. A vacuum pump creates a vacuum inside the vacuum chamber which in turn applies a uniform load to the wood-based panel. A displacement sensor measures the deformation of the wood-based panel under load to obtain mechanical performance parameters.

SUMMARY

There is provided a testing apparatus for applying a test load to a specimen. The testing apparatus comprises a cradle and a test bed supported on the cradle. The test bed has a chamber which receives a specimen and is hermetically sealed with the specimen received inside. There is a vacuum source in communication with the chamber. The vacuum source provides vacuum pressure to the chamber, thereby applying a uniform load to the specimen.

There is also provided a testing apparatus for applying a test load to a specimen. The testing apparatus comprises a cradle and a test bed supported on the cradle. The test bed has a chamber which receives a specimen and is hermetically sealed with the specimen received inside. There is a dampening mechanism for dampening potential motion. The dampening mechanism couples the test bed to the cradle and allows for relative vertical movement between the test bed and the cradle. There is a vacuum source in communication with the chamber. The vacuum source provides vacuum pressure to the chamber, thereby applying a uniform load to the specimen.

The dampening mechanism may dampen reaction forces from a sudden release of the vacuum pressure when the specimen fails under the load. The dampening mechanism may include a plurality of spring assembles. Each of the spring assemblies may include a spring and a bolt received by the spring. The testing apparatus may further include a flange extending outwardly from the test bed and a flange extending outwardly from the cradle. The dampening mechanism may include a shock absorber disposed between the flange of the test bed and the flange of the cradle.

The chamber may comprise a cavity having a mouth. The cavity may be covered by a flexible sheet and may be hermetically sealed where edges of the flexible sheet meet the mouth of the cavity. There may be a pressure gauge which measures pressure within the chamber. There may be an exhaust port to vent the chamber. The vacuum source may be a vacuum pump. The specimen may be a scaffold deck.

There is further provided a testing apparatus for applying a test load to a specimen. The testing apparatus comprises a cradle and a test bed supported on the cradle. The test bed has a bottom and a frame extending about the bottom to define a cavity. The cavity receives a specimen and is covered by a flexible sheet so as to hermetically seal the specimen inside. There is a dampening mechanism coupling the test bed to the cradle. There is also a vacuum source in communication with the test bed. The vacuum source provides vacuum pressure to the test bed. The vacuum pressure applies a uniform load to the specimen and the dampening mechanism dampens reaction forces from a sudden release of the vacuum pressure when the specimen fails under the load.

The testing apparatus may further include a pair of rails extending along the bottom of the test bed and on opposite sides thereof. Each of the rails may have a pair of support brackets which are each movable along a length of said rail such that the support brackets can support specimens of different lengths. There may be a pair of rods extending between the rails. Each of the rods may be supported on opposite support brackets. The rods may engage the specimen to support the specimen in an elevated position above the bottom of the test bed.

The bottom of the test bed may include a plurality of tubes extending perpendicularly along a length of the test bed. There may be a plurality of spacers disposed between the specimen and the test bed.

DESCRIPTION OF SPECIFIC EMBODIMENTS

Figure 1:
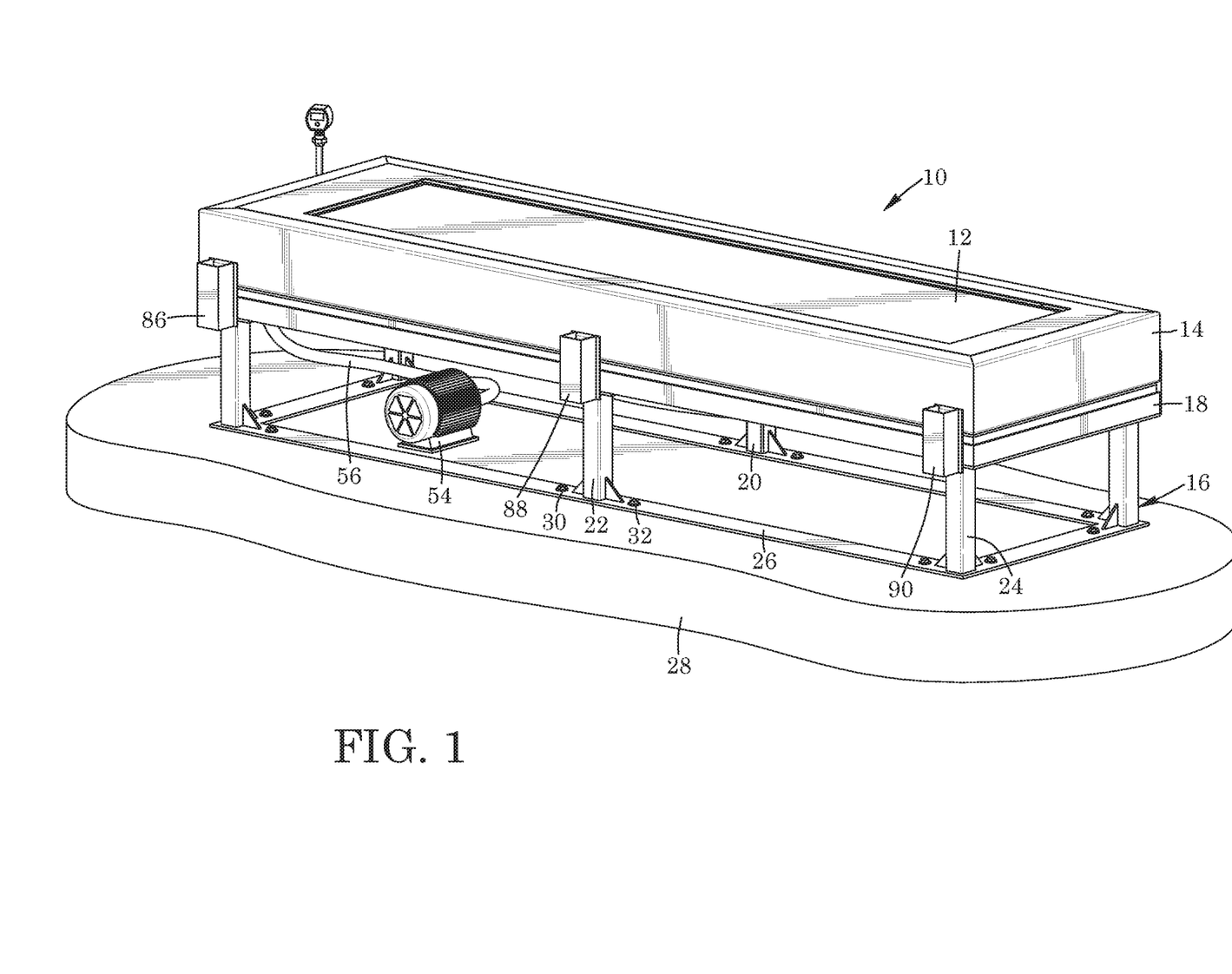
FIG. 1 is a perspective view of a testing apparatus for applying a test load to a scaffold deck.

Referring to the drawings and first to FIG. 1, there is shown a testing apparatus 10 for applying a test load to a specimen which, in this example, is a scaffold deck 12. The testing apparatus 10 comprises a test bed 14 supported on a cradle 16. The cradle 16 includes a cradle body 18 which receives the test bed 14. The cradle body 18 and the test bed 14 are both substantially rectangular in shape in this example. There is a plurality of legs, for example, legs 20, 22 and 24 extending downwardly from the cradle body 18.

In this example, the legs 20, 22 and 24 are substantially parallelepiped in shape but may be different shapes in other examples. There is a base plate 26 attached to the bottom ends of the legs which allows the testing apparatus 10 to be anchored to a floor 28 via fasteners, for example, bolts 30 and 32.

Figure 2:
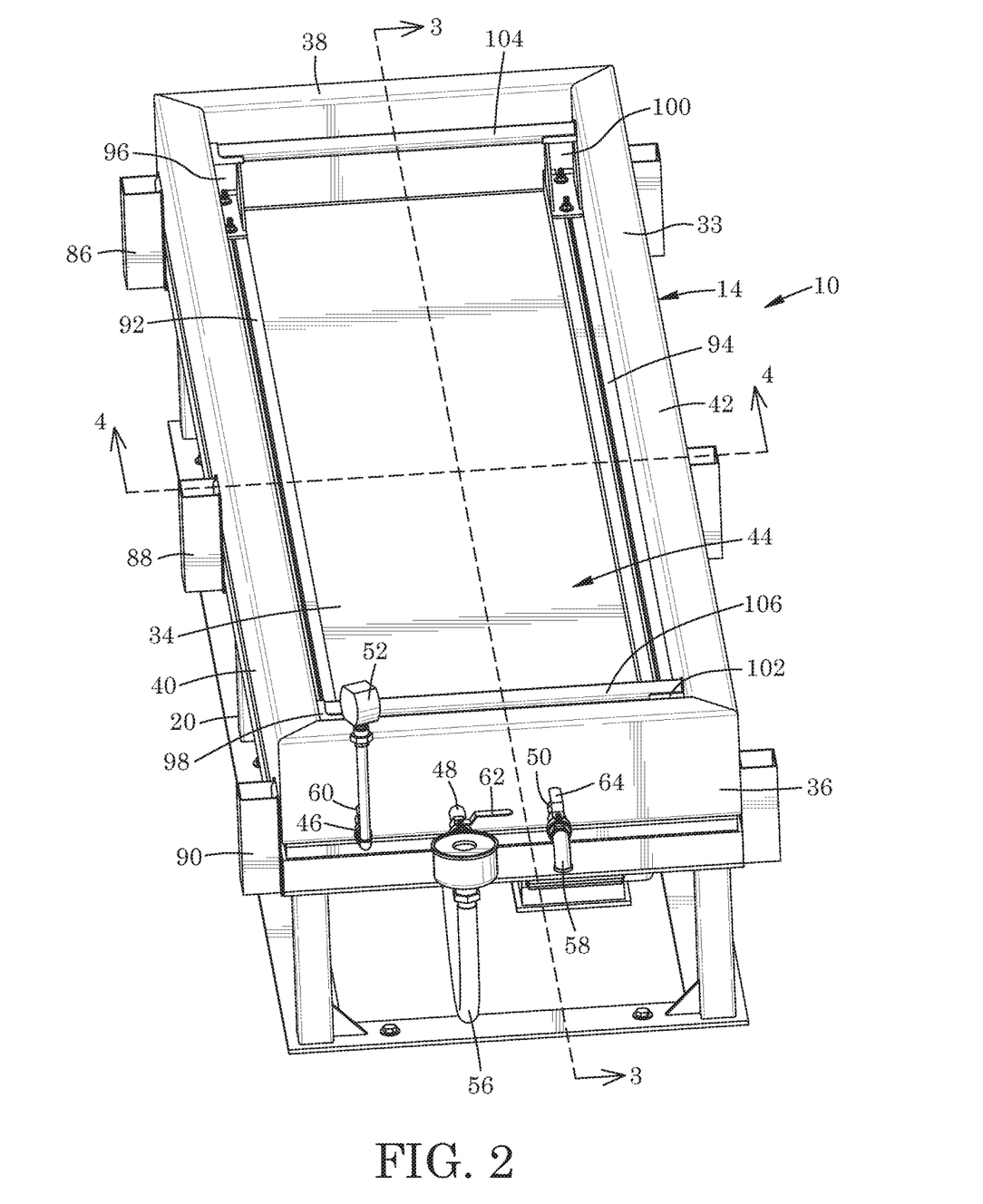
FIG. 2 is a perspective view of a test bed of the testing apparatus of FIG. 1.
Figure 3:
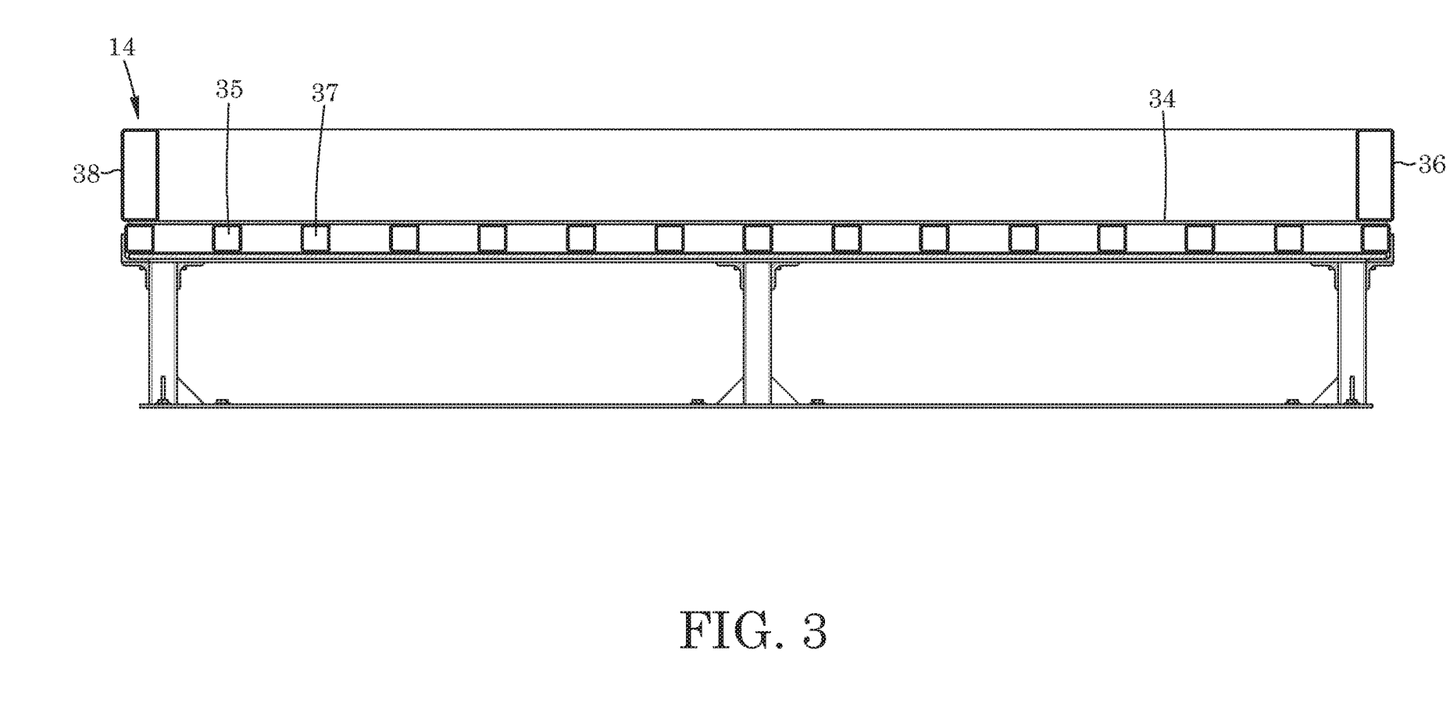
FIG. 3 is a cross-sectional view of the testing apparatus taken along line 3-3 of FIG. 2.

FIG. 2 shows the test bed 14 in greater detail. The test bed 14 includes a rectangular frame 33 which extends about a rectangular bottom 34. The frame 33 includes opposite end walls 36 and 38, and side walls 40 and 42 extending between the end walls. The frame 33 and the bottom 34 define a cavity 44 of the test bed 14 which receives the scaffold deck 12, as shown in FIG. 1, as will be described in detail below. As shown in FIG. 3, the bottom 34 of the test bed 14 has a plurality of tubes, for example, tubes 35 and 37 extending perpendicularly along a length of the test bed. The tubes 35 and 37 provided the required stiffness to the bottom 34 of the test bed 14 while minimizing the weight of the test bed 14.

Figure 4:
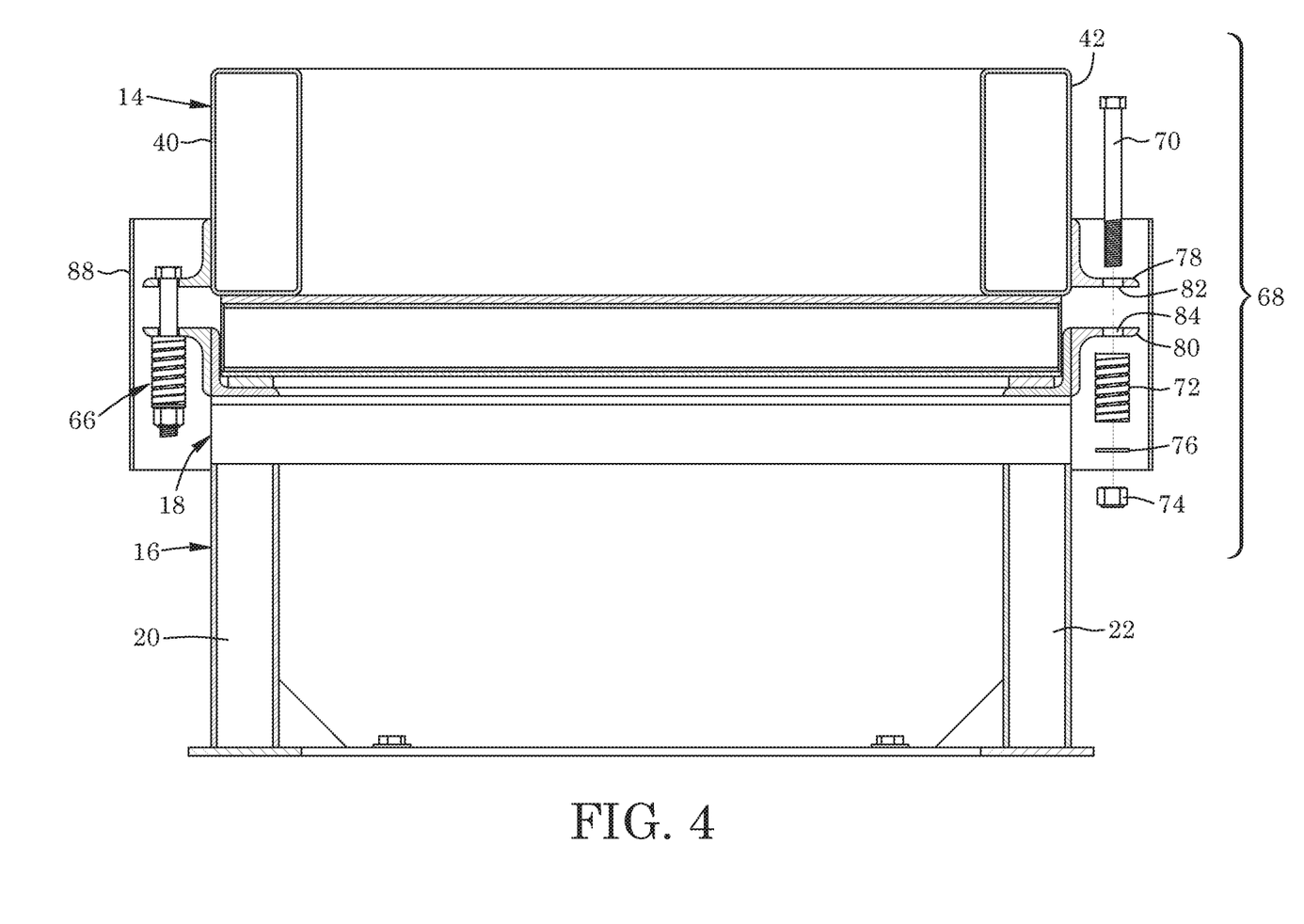
FIG. 4 is a cross-sectional view of the testing apparatus taken along line 4-4 of FIG. 2.

Referring to FIG. 4, the test bed 14 is connected to the cradle 16 by a dampening mechanism which, in this example, comprises a plurality of spring assemblies as shown by spring assemblies 66 and 68. The spring assembly 66 is shown assembled and the spring assembly 68 is shown exploded in FIG. 4. However, in other examples, the dampening mechanism may be another type of shock absorber such as a hydraulic shock absorber or an air shock absorber. Each of the spring assemblies in this example includes a bolt, a spring, and a nut as shown by a bolt 70, a spring 72, and a nut 74 of the spring assembly 68. The spring assemblies may also include a washer as shown by a washer 76 of the spring assembly 68. There is a flange 78 extending outwardly from the side wall 42 of the test bed 14 and a flange 80 extending outwardly from the cradle body 18 proximal to the leg 22. The flange 78 is provided with an aperture 82 and the flange 80 is provided with an aperture 84. The apertures 82 and 84 are aligned to receive the bolt 70, and the bolt 70 receives the spring 72, the nut 74, and the washer 76 to connect the test bed 14 and the cradle 16. In other examples, the stiffness of the spring 72 may be reduced and another spring may be disposed between the flanges 78 and 80 to serve as the dampening mechanism. The spring assemblies may each be provided with a cover as shown by covers 86, 88 and 90 in FIG. 1. In this example, the spring assemblies are generally aligned with the legs of the testing apparatus. However, in other examples, the spring assemblies may be positioned elsewhere on the testing apparatus.

Figure 5:
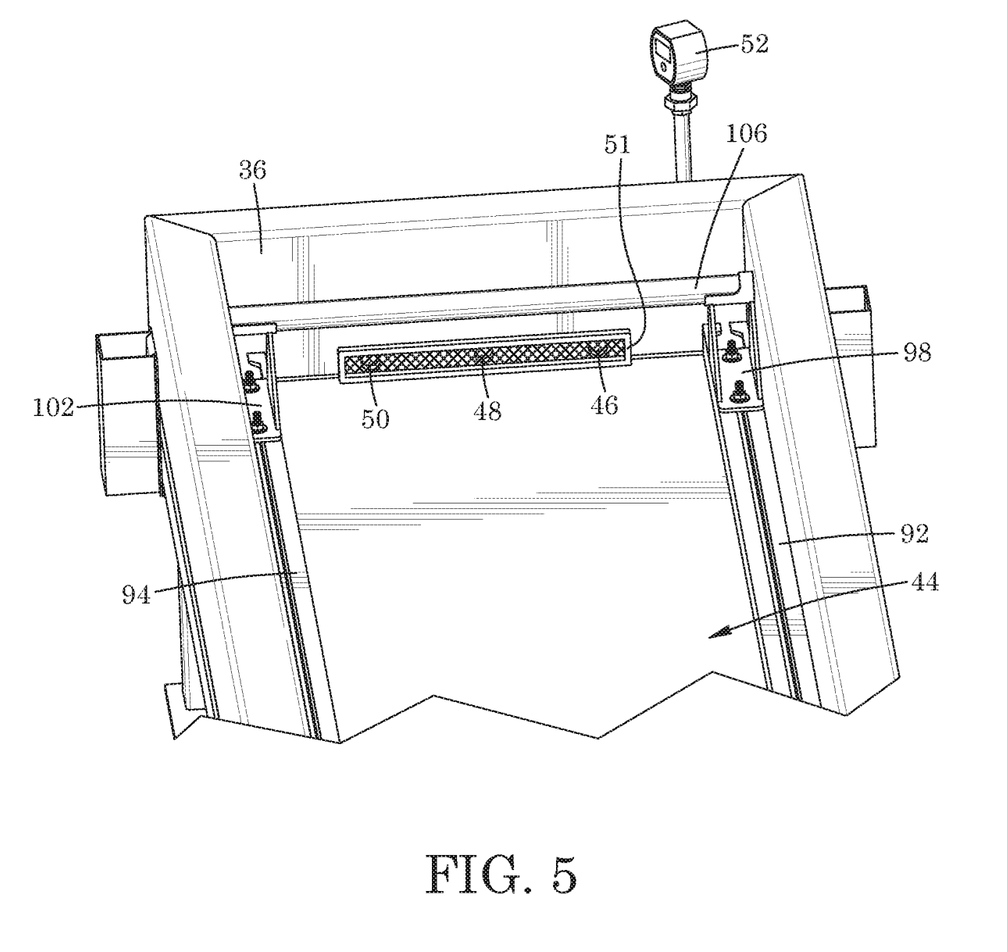
FIG. 5 is a fragmentary, perspective view of an end wall of the test bed of the testing apparatus of FIG. 1.

As best shown in FIG. 5, there is a plurality of ports, for example, ports 46, 48 and 50 which extend through the end wall 36. The port 46 is connected to a pressure gauge 52. Referring back to FIG. 1, the port 48 is connected to a vacuum source which, in this example, is a vacuum pump 54 via a hose 56. Referring now to FIG. 2, the third port 50 is connected to an exhaust outlet 58. Flow through the ports 46, 48 and 50 is controlled by individual ball valves 60, 62 and 64, respectively. The ports 46, 48 and 50 may be covered by a screen 51 within the cavity 44 as shown in FIG. 5 to inhibit the entry of debris into the ports from the test bed 14. There may also be one or more hermetically sealed ports for running cables into the test bed 14 to attach additional sensors or cameras.

As shown in FIG. 2, there are rails 92 and 94 extending along the bottom 34 of the test bed 14 adjacent the side walls 40 and 42. In this example, the rails 92 and 94 extend along substantially the entire length of the test bed 14. Each of the rails is provided with a pair of support brackets as shown by support brackets 96 and 98 for the rail 92 and support brackets 100 and 102 for the rail 94. The support brackets are each movable along the length of its respective rail. There is a rod 104 extending between the side walls 40 and 42 which is supported by opposite support brackets 96 and 100. Similarly, there is a rod 106 extending between the side walls 40 and 42 which is supported by opposite support brackets 98 and 102.

Figure 6:
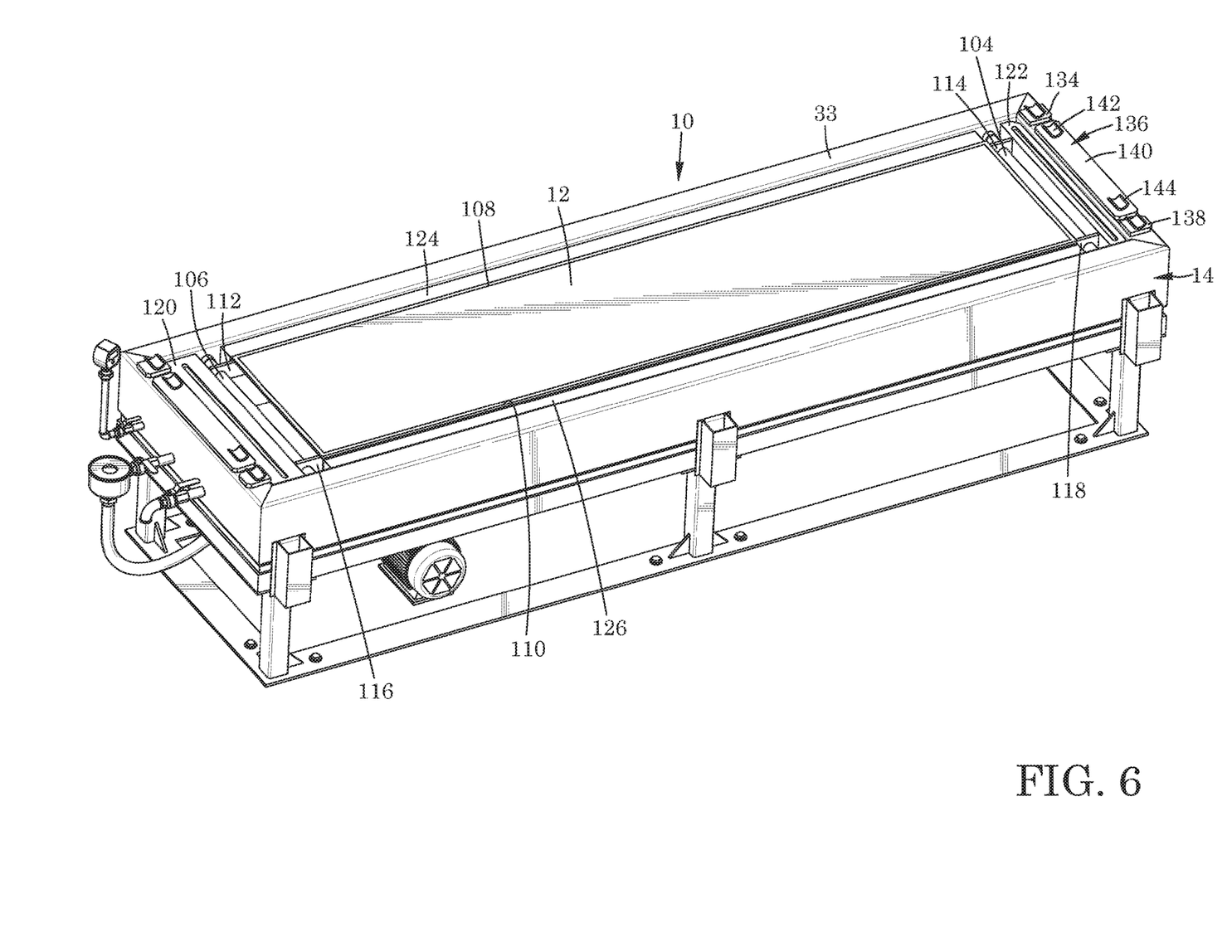
FIG. 6 is a perspective view of the testing apparatus of FIG. 1 showing a scaffold deck received in the test bed.

Referring now to FIG. 6, the scaffold deck 12 has side rails 108 and 110 with hooks on the ends thereof as shown by hooks 112 and 114 for the side rail 108 and hooks 116 and 118 for the side rail 110. The hooks 112 and 116 are received by the rod 106 and the hooks 114 and 118 are received by the rod 104 to support the scaffold deck 12 within the test bed 14. The rods 104 and 106 elevate the scaffold deck 12 above the bottom 34 of the test bed 14, shown in FIG. 2, to allow for deflection of the scaffold deck 12 during testing. As the support brackets 96 and 98 are movable along the rail 92 and the support brackets 100 and 102 are movable along the rail 94, the distance between the rods 104 and 106 can be adjusted to accommodate scaffold decks of different lengths.

Figure 7:
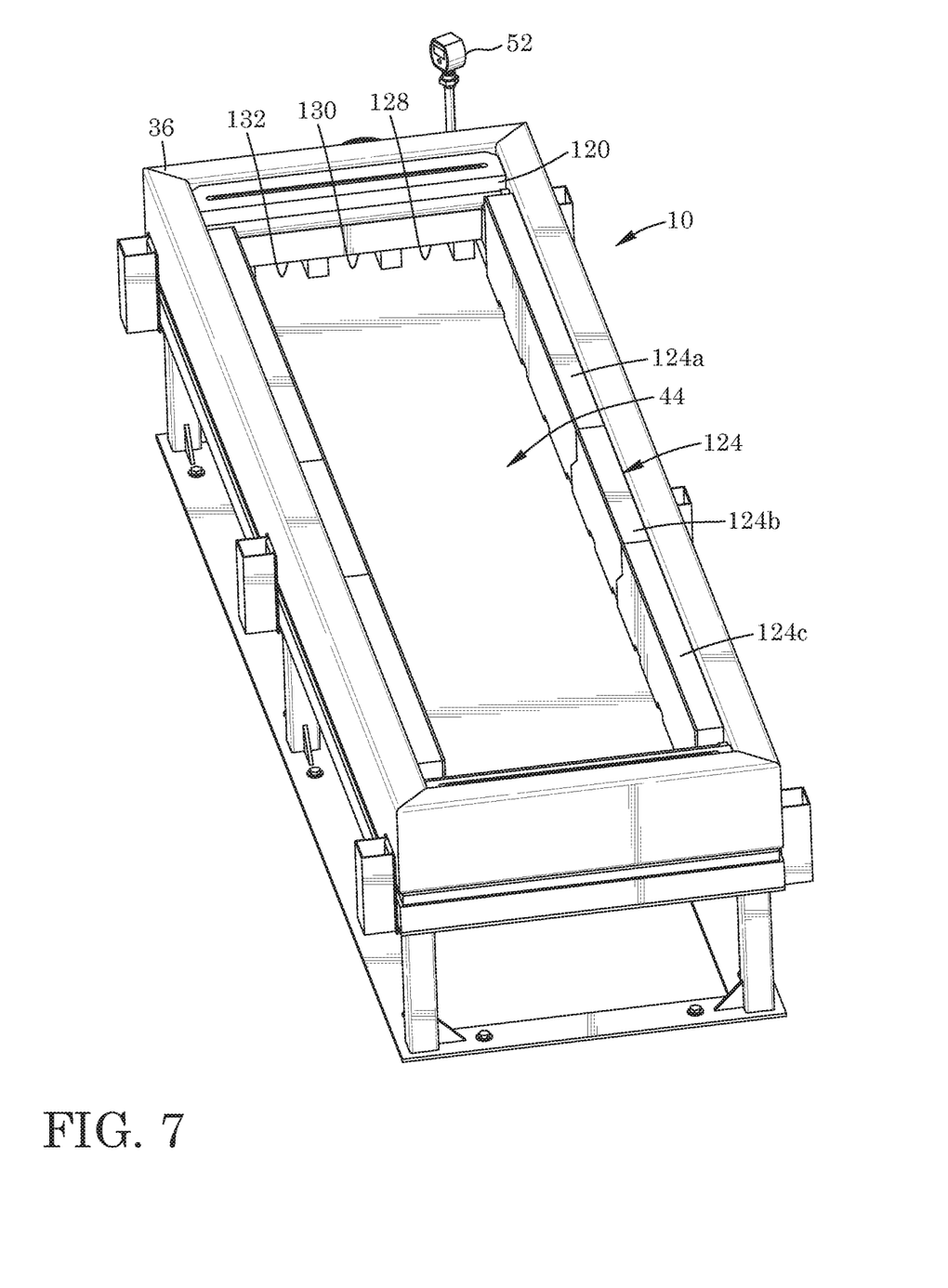
FIG. 7 is a perspective view of the test bed of the testing apparatus of FIG. 1 showing spacers placed therein.

Referring back to FIG. 6, there may be a plurality of spacers, for example, spacers 120, 122, 124 and 126 placed between the scaffold deck 12 and the frame 33 of the test bed 14. The spacers may be of unitary construction as shown in FIG. 6, or may be of modular construction as shown in FIG. 7. In FIG. 7, the spacer 124 comprises a plurality of interlocking spacers 124a, 124b and 124c. The spacer 120 adjacent to the end wall 36 may have a plurality of slots, for example, slots 128, 130 and 132 corresponding to the positions of the ports 46, 48 and 50, shown in FIG. 5, to allow the ports to communicate with the cavity 44.

Figure 8:
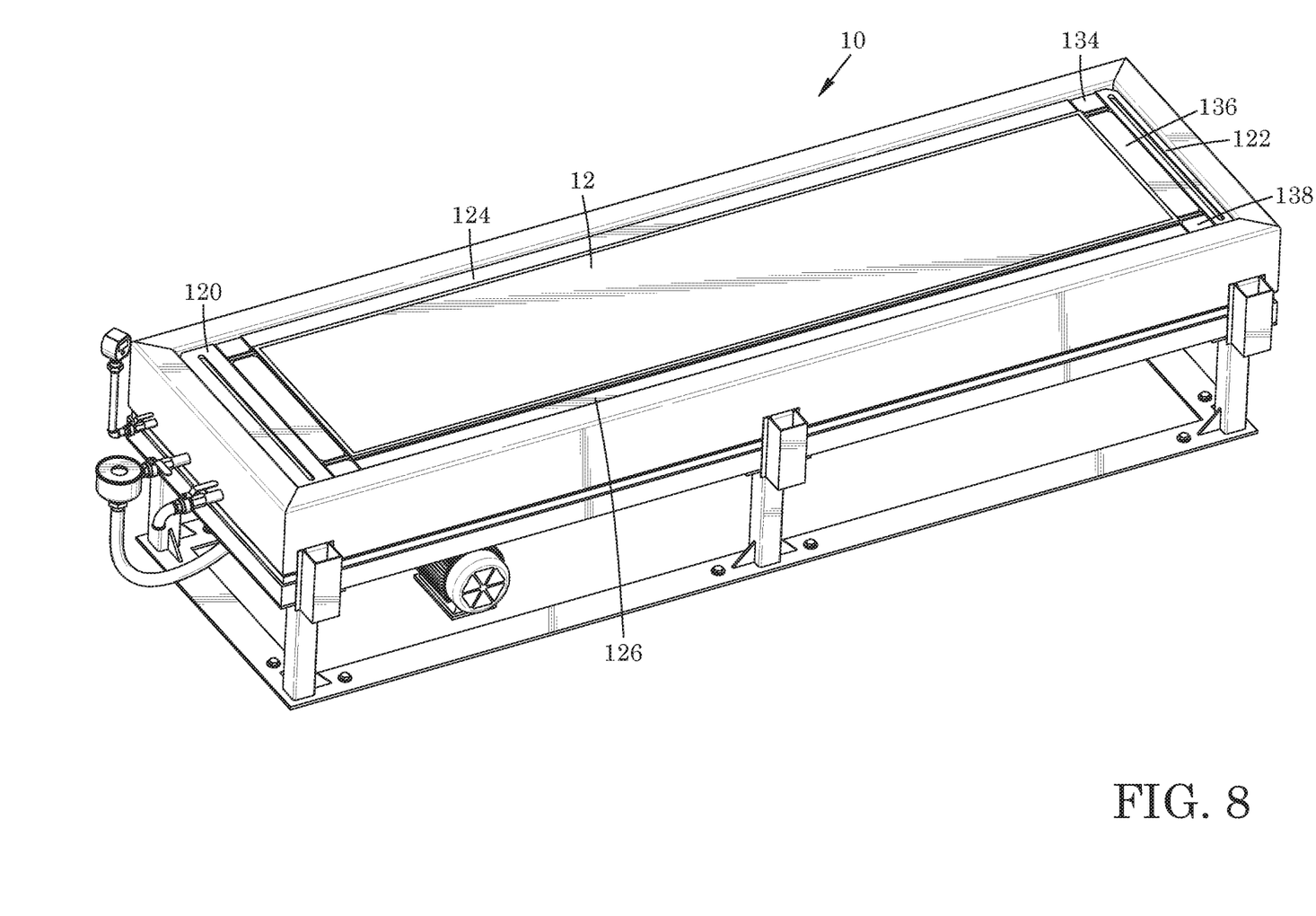
FIG. 8 is a perspective view of the testing apparatus of FIG. 1 showing the scaffold deck received in the test bed with spacers placed between the scaffold deck and the test bed.
Figure 9:
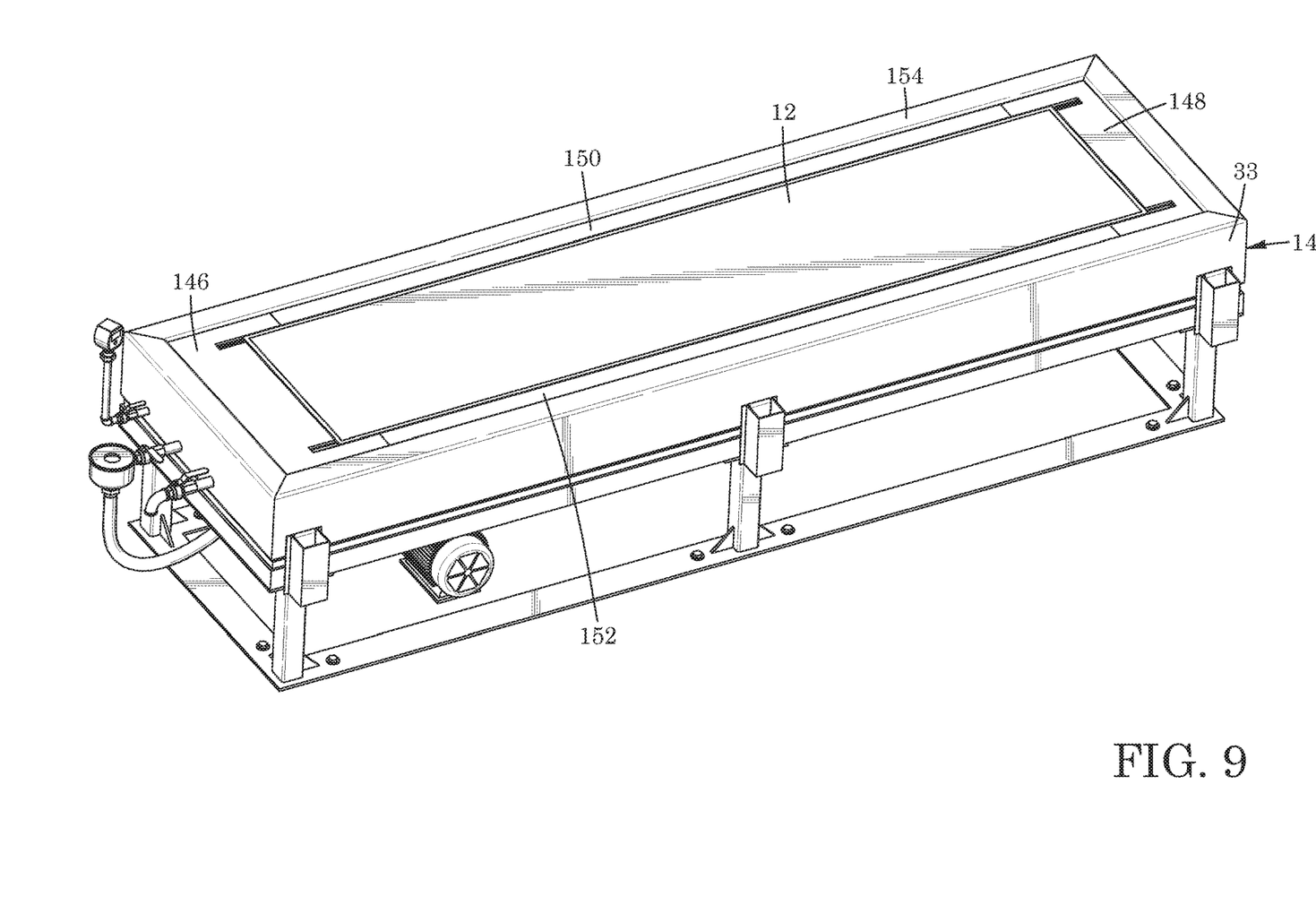
FIG. 9 is a perspective view of the testing apparatus of FIG. 1 showing the scaffold deck received in the test bed and covers placed over the spacers.

Referring again to FIG. 6, there are covers which fit over the rods 104 and 106 as shown by covers 134, 136 and 138 for the rod 104. The covers are shown in an uncovered configuration in FIG. 6. Each of the covers includes a planar portion and at least one semi-circular portion as shown by planar portion 140 and semi-circular portions 142 and 144 for the cover 136. The semi-circular portions are shaped to correspond to the curvature of the rods 104 and 106 so that the covers sit on top of the rods when in the covered configuration as shown in FIG. 8. There is also a plurality of planar members, for examples, planar members 146, 148, 150 and 152 placed over the spacers as shown in FIG. 9. The top surfaces of the planar members 146, 148, 150 and 152 and the scaffold deck 12 are flush with a top surface 154 of the frame 33 of the test bed 14 in this example.

Figure 10:
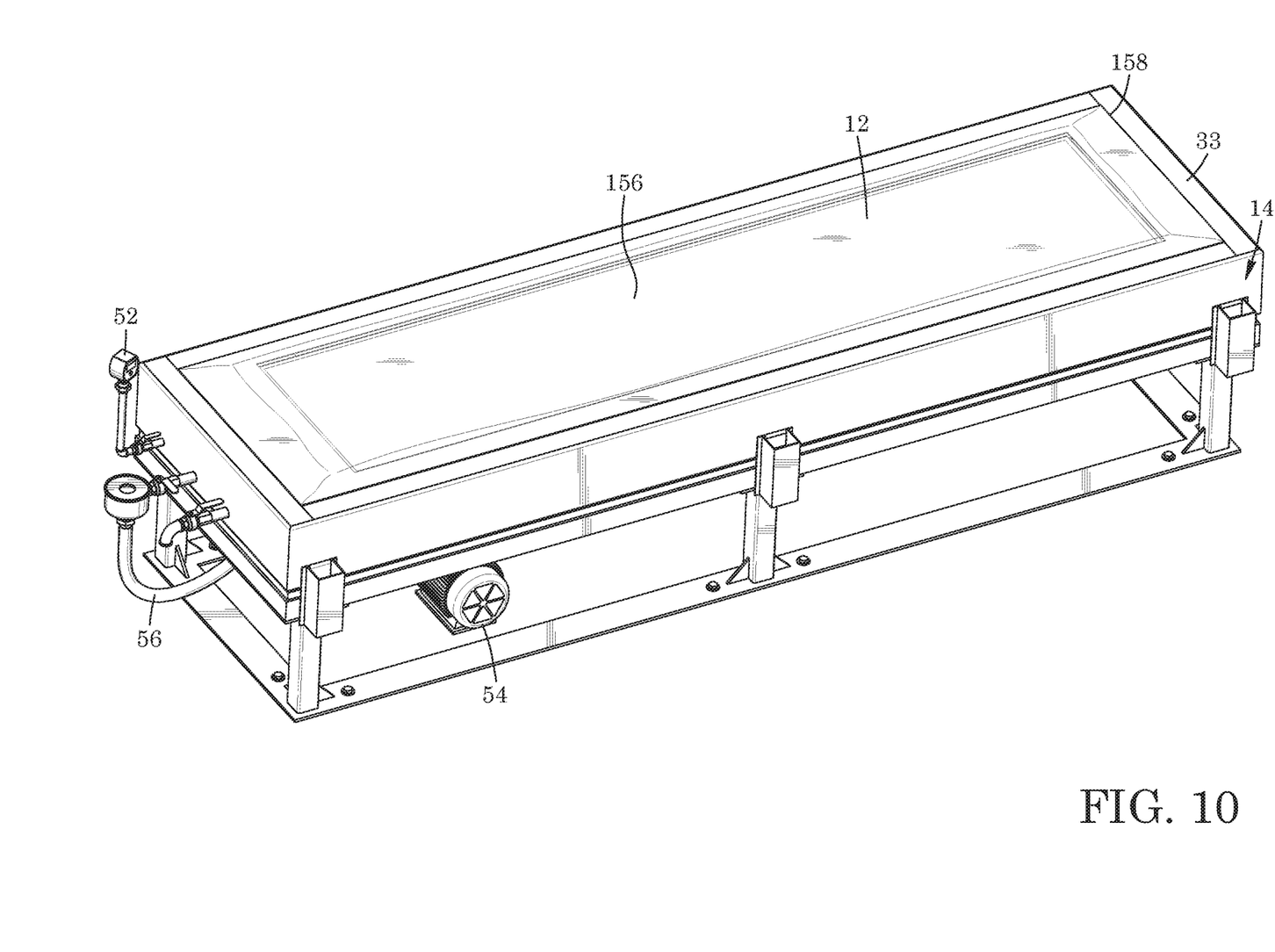
FIG. 10 is a perspective view of the testing apparatus of FIG. 1 showing the scaffold deck received in the test bed and covered by a flexible sheet.
Figure 11:
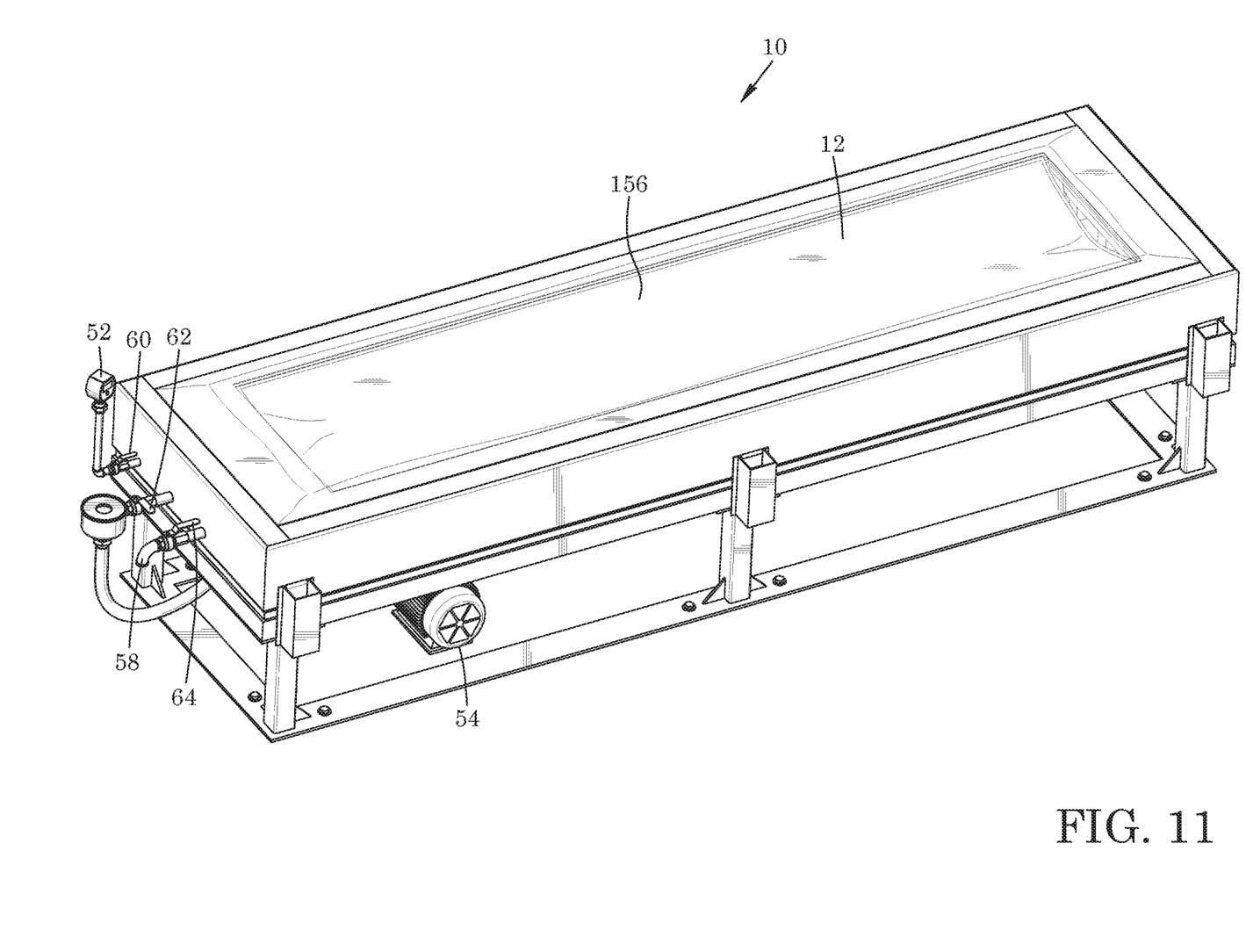
FIG. 11 is a perspective view of the testing apparatus of FIG. 1 showing the scaffold deck failing under vacuum pressure applied to the test bed.

FIG. 10 shows the scaffold deck 12 covered by a flexible sheet 156 and hermetically sealed where edges 158 of the sheet meet the frame 33 of the test bed 14. Accordingly, the test bed 14 functions as a vacuum chamber when covered with the flexible sheet 156. Vacuum pressure is applied to the vacuum chamber via the vacuum pump 54 and the hose 56. The vacuum pressure applies a uniformly distributed load across the top surface of the scaffold deck 12 until the scaffold deck fails as shown in FIG. 11. The flexible sheet 156 may be made of plastic or a sufficiently resilient material so that the sheet does not rip before the scaffold deck 12 fails under the load. The flexible sheet 156 may also be folded in the pre-test configuration, shown in FIG. 10, to allow the sheet to unfold as vacuum pressure is applied to the vacuum chamber, thereby preventing the sheet from ripping before the scaffold deck 12 fails under the load. Likewise, the various spacers and planar members described above also help to ensure that the flexible sheet 156 does not rip before the scaffold deck 12 fails under the load.

The two-part construction of the testing apparatus 10 comprising of the test bed 14 and the cradle 16 allows the test bed a small degree of movement in response to the explosive energy released when the scaffold deck 12 under test fails. The spring assemblies also provide a dampening of this reaction.

The pressure gauge 52 measures absolute pressure within the vacuum chamber when the scaffold deck 12 is under test. The exhaust outlet 58 functions to vent the vacuum chamber to atmosphere. The valves 62 and 64 can be operated either separately or in concert to adjust the rate of vacuum being applied to the chamber.

It will be understood by a person skilled in the art that the testing apparatus is described herein for applying a test load to a scaffold deck, but that the testing apparatus could be used to apply a test load to any item with a reasonably flat surface.

It will be further understood by a person skilled in the art that many of the details provided above are by way of example only, and are not intended to limit the scope of the invention which is to be determined with reference to the following claims.

What is claimed is:

1. A testing apparatus for applying a test load to a specimen, the testing apparatus comprising:
    a cradle;
    a test bed supported on the cradle, the test bed having a bottom and a frame extending about the bottom to define a cavity, the cavity receiving a specimen and being covered by a flexible sheet so as to hermetically seal the specimen inside;
    a pair of rails extending along the bottom of the test bed and on opposite sides thereof, each of the rails having a pair of support brackets which are each movable along a length of said rail such that the support brackets can support specimens of different lengths;
    a dampening mechanism coupling the test bed to the cradle; and
    a vacuum source in communication with the test bed, the vacuum source providing vacuum pressure to the test bed, wherein the vacuum pressure applies a uniform load to the specimen and the dampening mechanism dampens reaction forces from a sudden release of the vacuum pressure when the specimen fails under the load.

2. The testing apparatus of claim 1, wherein the dampening mechanism includes a plurality of spring assembles.

3. The testing apparatus of claim 2, wherein each of the spring assemblies includes a spring and a bolt received by the spring.

4. The testing apparatus of claim 1, further including a flange extending outwardly from the test bed and a flange extending outwardly from the cradle, wherein the dampening mechanism includes a shock absorber disposed between the flange of the test bed and the flange of the cradle.

5. The testing apparatus of claim 1, further including a pressure gauge which measures pressure within the test bed.

6. The testing apparatus of claim 1, further including an exhaust port to vent the test bed.

7. The testing apparatus of claim 1, wherein the vacuum source is a vacuum pump.

8. The testing apparatus of claim 1, wherein the specimen is a scaffold deck.

9. The testing apparatus of claim 1, further including a pair of rods extending between the rails, each of the rods being supported on opposite support brackets, the rods engaging the specimen to support the specimen in an elevated position above the bottom of the test bed.

10. The testing apparatus of claim 1, wherein the bottom of the test bed includes a plurality of tubes extending perpendicularly along a length of the test bed.

11. The testing apparatus of claim 1, further including a plurality of spacers disposed between the specimen and the test bed.

* * * * *